United States Patent [19]

Sato et al.

[11] Patent Number: 4,670,324
[45] Date of Patent: Jun. 2, 1987

[54] HOLLOW PLATE MADE OF SYNTHETIC RESIN

[75] Inventors: Toru Sato; Yoshihiro Asano, both of Ayase, Japan

[73] Assignee: Ikeda Bussan Co., Ltd., Kanagawa, Japan

[21] Appl. No.: 817,662

[22] Filed: Jan. 10, 1986

[30] Foreign Application Priority Data

Jan. 12, 1985 [JP] Japan .................................. 60-1811

[51] Int. Cl.$^4$ .......................... B05D 3/12; B05D 1/24; E04H 15/00; B60R 7/04
[52] U.S. Cl. .................................... 428/178; 428/182; 428/188; 52/287; 52/387; 52/508; 52/592; 296/31 P; 296/37.16; 296/37.8; 296/191
[58] Field of Search ................... 296/37.16, 37.8, 191, 296/31 P; 52/173, 287, 387, 392, 508, 592; 428/178, 182, 188

[56] References Cited

U.S. PATENT DOCUMENTS

| 3,132,874 | 5/1964 | Baudou | 280/11.13 |
| 3,500,606 | 3/1970 | Wharmby | 52/589 |
| 3,992,835 | 11/1976 | Saveker | 52/220 |
| 4,038,798 | 8/1977 | Sachs | 52/309.7 |
| 4,119,794 | 10/1978 | Matsuki | 174/68 R |
| 4,267,223 | 5/1981 | Swartz | 428/172 |

FOREIGN PATENT DOCUMENTS

| 2921813 | 12/1979 | Fed. Rep. of Germany . |
| 0194164 | 11/1982 | Japan . |
| 0066514 | 12/1982 | Japan . |
| 0149838 | 8/1984 | Japan . |

Primary Examiner—John E. Kittle
Assistant Examiner—Patrick S. Ryan
Attorney, Agent, or Firm—Schwartz, Jeffery, Schwaab, Mack, Blumenthal & Evans

[57] ABSTRACT

A hollow plate made of synthetic resin characterized in that the plate is made of synthetic resin to have hollow portions therein and that a reinforcement member is forcedly inserted into at least one of the hollow portions. The hollow portion into which the reinforcement member is forcedly inserted extends from one side of the plate to the other side thereof and an opening through which the reinforcement member is inserted is formed at that side of the plate which corresponds to the hollow portion. The strength of the plate can be thus enhanced without making its appearance unattractive and thus surface of the plate can be made plain and smooth. Therefore, it can be satisfactorily used as luggage panels or the like.

5 Claims, 6 Drawing Figures

HOLLOW PLATE MADE OF SYNTHETIC RESIN

BACKGROUND OF THE INVENTION

1. Field of the Invention

The present invention relates to a hollow plate made of synthetic resin, which can be used as luggage panels located behind the rear seats in a car, for example.

2. Description of the Prior Art

A partition plate (which is also called package tray) is used in the car of the hatch-back type, for example, to partition the car room from the truck room. This partition plate is usually made of woody material such as the hardboard. As it is made of woody material, however, it has a limitation upon its being processed, its weight is large when completed as a product, and it needs surface polishing, thereby making its cost high. In order to solve these problems, it has been proposed that a light and easily-processed hollow plate is formed, as the luggage panel for the car, for example, by blow-molding synthetic resin. This luggage panel is arranged substantially horizontal behind the rear seats in the car of hutch-back type to partition the car room from the trunk room. The space on and above the thus-arranged luggage panel is used as luggage space, so that various kinds of luggages can be mounted on the luggage panel.

However, the luggage panel which is formed by the hollow plate made of synthetic resin cannot provide sufficient strength.

FIGS. 1 and 2 show the conventional luggage panel which has been proposed to solve the lack-of-strength problem. This luggage panel is formed as a panel (or plate) 1 made of synthetic resin and comprising upper and lower faces 2 and 3, hollow portions 4 formed between the upper of lower face 2 or 3, and rigid reinforcement members 6 fitted into these grooves 5. In the case of this hollow plate, however, a part of the metal reinforcement members is exposed and comes into sight, thereby making the appearance of the hollow plate less attractive. In addition, these reinforcement members are protruded or recessed from the upper surface of the hollow plate, thereby making it difficult to make the upper surface of the hollow plate plain. Further, there is the posibility that the luggages which is to be mounted on or gotten off from the luggage panel are caught or disturbed by the protruded reinforcement members.

Furthermore, the provision of the grooves and particularly the reinforcement members forcedly fitted into these grooves makes it necessary that each of the grooves is formed to have same width from the bottom to the top thereof, or tapered from the bottom toward the top thereof, thereby making the molding profile of the hollow plate complicated.

SUMMARY OF THE INVENTION

The object of the present invention is to provide a hollow plate made of synthetic resin and capable of being molded without making its profile complicated, and keeping the reinforcement members out of sight, and easy to form its outer surface plain.

The hollow plate according to the present invention is made of synthetic resin and formed like a plate containing hollow portions therein. The thus-formed hollow plate is characterized in that a reinforcement member is forcedly inserted into at least one of the hollow portions. A metal pipe is used as the reinforcement member and this metal pipe is inserted into the hollow portion from the sides of the hollow plate.

As the pipe is inserted into the hollow portion of the plate as described above, the reinforcement members can be kept out of sight. Therefore, the appearance of the hollow plate can be made beautiful and plain surface can be freely formed at any area of the hollow plate. As the reinforcement members can be kept out of sight, limitation on the material and color of the reinforcement can be almost eliminated and they can be selected over a wider range.

In addition, it is not needed that the groove into which the reinforcement member is to be fitted is formed on the outer surface of the hollow plate. Therefore, the molding profile of the hollow plate can be made simple and its molding can be thus made easy.

These and other objects as well as merits of the present invention will be become apparent from the following detailed description with reference to the accompanying drawings.

DESCRIPTION OF THE PREFERRED EMBODIMENT

An example of the hollow plate according to the present invention which is used as luggage panel in the car will be described in detail with reference to the accompanying drawings.

Figure 1:
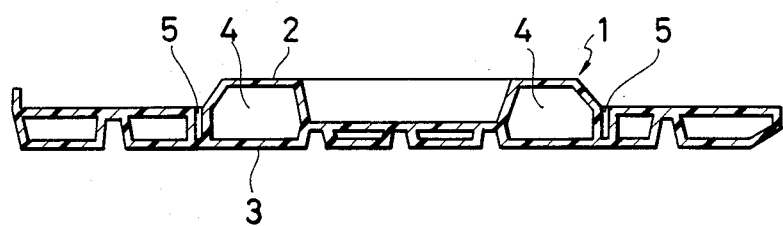
FIG. 1 is a sectional view showing an example of the conventional hollow plate made of synthetic resin.
Figure 2:
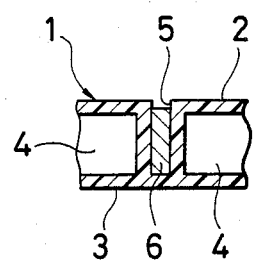
FIG. 2 is a partly-sectioned view showing a groove and a reinforcement member fitted into the groove in the case of the resin-made hollow plate shown in FIG. 1.
Figure 3:
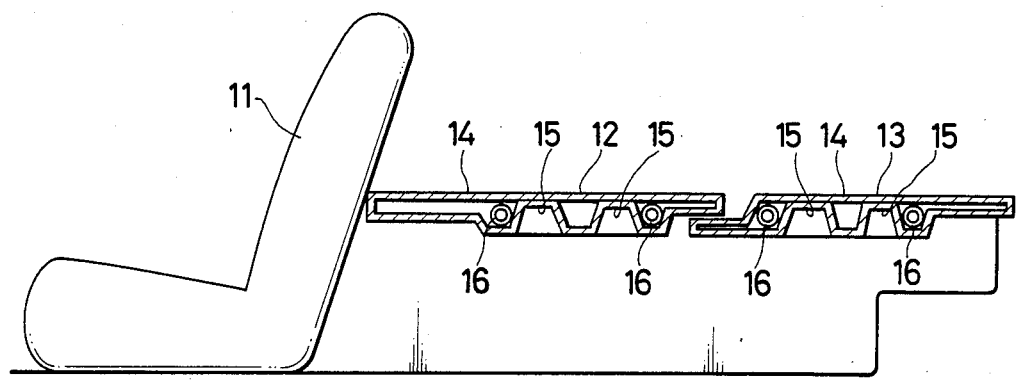
FIG. 3 is a sectional view showing an example of the hollow plate made of synthetic resin according to the present invention and used as the luggage panel in the car.
Figure 4:
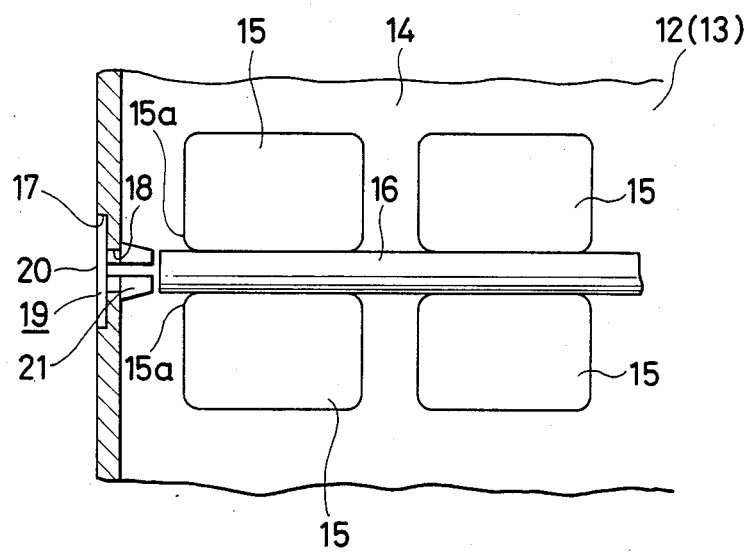
FIG. 4 is a partial plan view showing a reinforcement member inserted into the luggage panel.

FIG. 3 is a sectional view showing luggage panels arranged in the car. In the case of this embodiment of the present invention, a pair of luggage panels 12 and 13 are arranged behind rear seats in the longitudinal direction of the car to openably partition the car room from the trunk room. Each of the luggage panels 12 and 13 is made of synthetic resin and blow-molded to a plate which contains hollow portions 14 therein. Reinforcement means (or portions) 15 each of which is protruded upward from the bottom side and closely contacted with the upper side of the luggage panel are intermittently formed on the bottom side of each of the luggage panels 12 and 13. As shown in FIG. 4, the reinforcement portion 15 is formed substantially rectangular and the hollow portion 14 is formed between the reinforcement portions 15.

A reinforcement member 16 is inserted into the hollow portion 14. As shown in FIG. 3, the reinforcement member 16 is a metal pipe which has rigidity large enough relative to the hollow plate made of resin.

Figure 5:
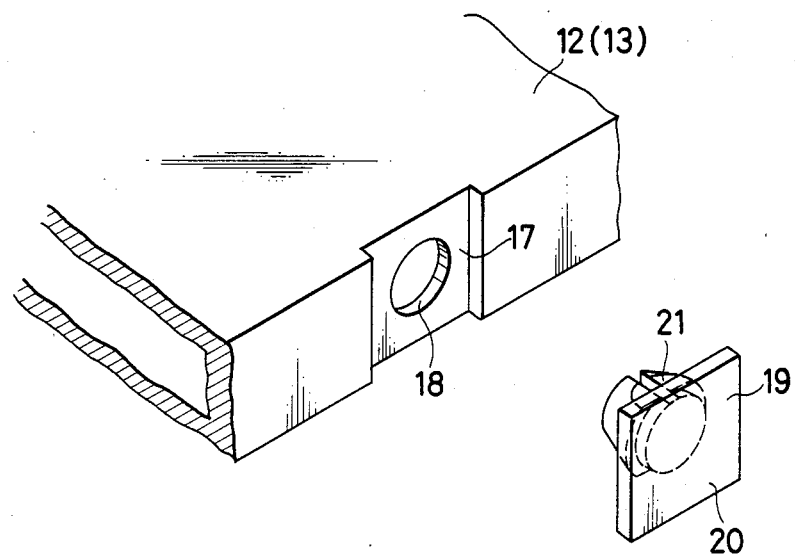
FIG. 5 is a perspective view showing an opening through which the reinforcement member is inserted, and a detachable cap which is fitted into the opening.

The reinforcement member 16 is inserted into the hollow portion 14 through an opening 18 at a cut-away portion 17 on one side of each of the luggage panels 12 and 13, as shown in FIG. 5, and it is kept there, sandwiched between the reinforcement portions 15 along the width of the car, as shown in FIG. 4. A curved slope 15a is formed at each of corners of the reinforcement portions 15 to guide the reinforcement member 16 inserted through the opening 18.

Figure 6:
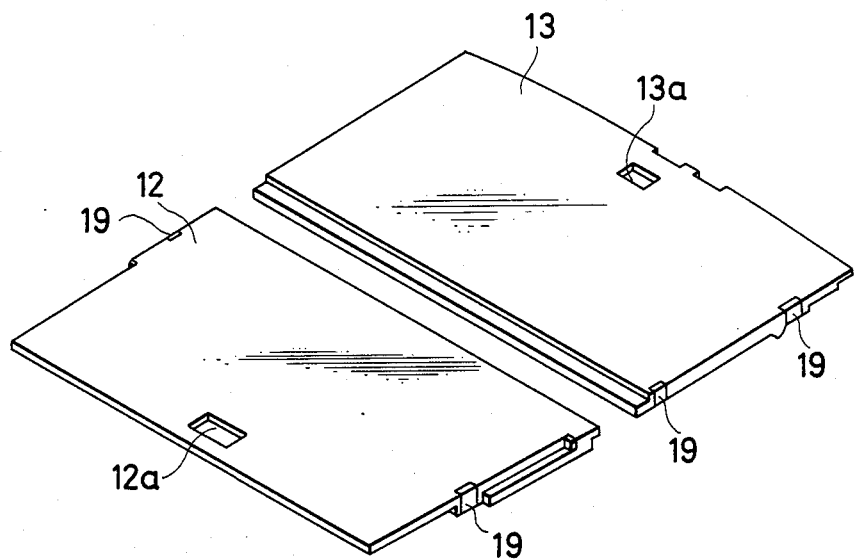
FIG. 6 is a perspective view showing the appearance of the luggage panel.

The cut-away portion 17 is closed by a cap member 19, as shown in FIG. 5. The cap member 19 is made of synthetic resin and comprises a rectangular cap 20 which corresponds in shape to the cut-away portion 17, and a protrusion 21 which is fitted into the opening 18. The protrusion 21 is provided with a slit along the center line thereof to elastically shrink the diameter thereof in a direction perpendicular to the slit. The protrusion 21 can be thus fitted into the opening 18, as shown in FIG. 4. When the protrusion 21 is fitted into the opening 18, the cap 20 is held in the cut-away portion 17 to keep its outer face 19 same in level with the circumstantial outer side of the luggage panels 12 and 13, as shown in FIG. 6.

The circumferential outer sides of the luggage panels 12 and 13 are subject to surface treatment such as embossing, for example. Hand hooks 12a and 13a are provided on the upper surfaces of the luggage panels 12 and 13.

The luggage panels 12 and 13 have strength enough to load because they have the reinforcement members 16 inserted therein.

As each of the reinforcement members 16 is fully housed in the luggage panels and the openings 18 through which the reinforcement members 16 are inserted are closed by the cap members 19, the appearance of the luggage panels 12 and 13 looks like an integral unit made of synthetic resin.

The present invention is not limited to the luggage panel but can be applied to various kind of plates. The reinforcement members which are housed in the hollow plate may be changed depending upon the shape of the hollow portions and strength needed.

Although the present invention has been described with reference to the preferred embodiment thereof, it should be understood that various changes and modifications can be made by those skilled in the art without departing from the scope and spirit of the present invention.

What is claimed is:

1. A plate for partitioning car rooms comprising:
    a hollow plate made of synthetic resin;
    a plurality of generally rectangularly shaped reinforcement portions which are intermittently formed and defining hollow portions therebetween and protruding upwardly from a bottom side of the hollow plate; and
    a reinforcement member forcibly inserted into at least one of the hollow portions.

2. A hollow plate made of synthetic resin according to claim 1 wherein;
    the hollow portion into which the reinforcement member is inserted extends from one side of the plate to the other side thereof and an opening through which the reinforcement member is inserted is formed at that side of the plate which corresponds to the hollow portion.

3. A hollow plate made of synthetic resin according to claim 2 wherein;
    a cap member is fitted into the opening to prevent the reinforcement member from coming out of the opening.

4. A hollow plate made of synthetic resin according to claim 3 wherein;
    the reinforcement member is a metal pipe.

5. A hollow plate made of synthetic resin according to claim 1 wherein;
    at each of corners of the reinforcement portions, a curved slope which guides the reinforcement member being inserted through an opening provided on one side of the hollow plate is formed.

* * * * *